United States Patent Office 3,463,004
Patented Aug. 26, 1969

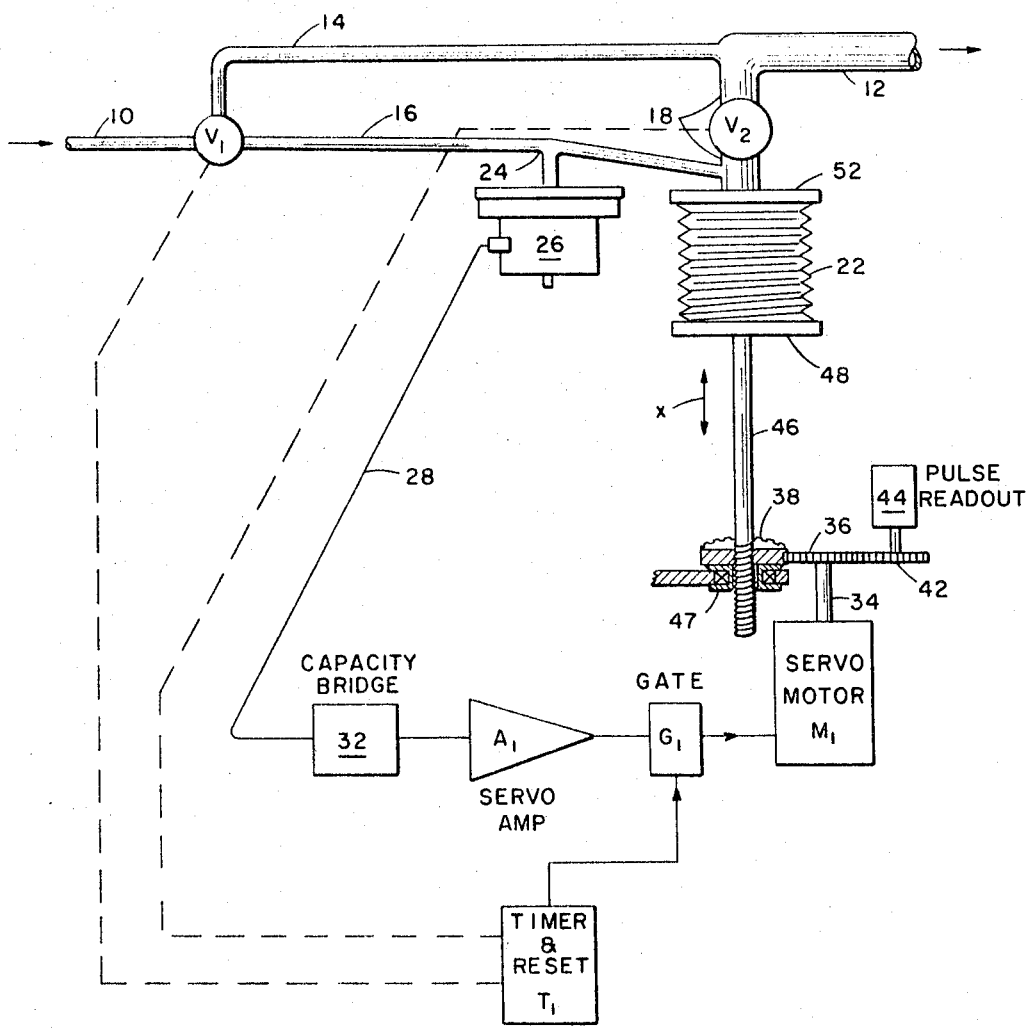

3,463,004
VOLUMETRIC FLOW MEASUREMENT
Ronald Withnell, Wading River, N.Y., assignor to the United States of America as represented by the United States Atomic Energy Commission
Filed May 12, 1967, Ser. No. 639,596
Int. Cl. G01f 3/02
U.S. Cl. 73—232                                    3 Claims

ABSTRACT OF THE DISCLOSURE

A system for measuring volumetrically the flow of a gaseous fluid independently of fluid density and viscosity. The system utilizes a bellows to receive the fluid flow when a downstream valve is closed. A servo system expands the bellows at a rate to maintain pressure at a constant value within the tube containing the fluid. The rate of bellows expansion gives the volumetric flow rate.

BACKGROUND OF THE INVENTION

The invention described herein was made in the course of, or under a contract with the U.S. Atomic Energy Commission.

The present invention relates to volumetric gas flow measurement in a way which is unrelated to gas density or viscosity.

The volumetric measurement of gaseous flow can be accomplished indirectly by the use of pressure measurement based upon which calculations are made, or more directly by the use of vanes and similar type direct measuring devices. In the former type of arrangement, there is a great dependence on ideal flow conditions and approximations while in the latter type arrangement, there is a tendency for the measuring apparatus itself to alter or influence the conditions of flow. In both types of approaches results are somewhat related to fluid density and viscosity in varying degrees, and accuracy may be satisfactory for some situations but not completely satisfactory in other situations.

In a typical gas chromatograph system the gaseous effluent is discharged at atmospheric pressure. Small changes in effluent pressure in excess of .001 mm. of mercury adversely affect the operation of the column, and related to the operation of the column itself, it is necessary to monitor continuously the volumetric rate of gaseous flow therethrough. Due to the very small pressure variations permissible, it was discovered that no technique was available for automatic measurement of volumetric flow which would be independent of gas density and viscosity.

SUMMARY OF THE INVENTION

The present invention overcomes the disadvantages of previous gaseous volumetric flow measurement systems by providing a way of obtaining such information without dependence on density or viscosity of the gas in question.

Briefly described, the invention embodies a bellows to expand at a rate to accommodate the flowing gas and a very sensitive pressure detector and servo system which insures bellows expansion at exactly the rate required not to alter the fluid pressure in the system. The basic arrangement need be modified only slightly to be continuous in operation.

It is thus a principal object of this invention to provide a way of measuring volumetrically the flow of a gaseous fluid with a high degree of accuracy, and which is not dependent on the density or the viscosity of the fluid.

Other advantages and objects of this invention will becomes readily apparent from the following description of a preferred embodiment of this invention given with reference to the accompanying drawing.

BRIEF DESCRIPTION OF THE DRAWING

The figure shows somewhat schematically a flow measuring system embodying the principles of this invention.

DESCRIPTION OF THE PREFERRED EMBODIMENTS

Referring to the figure, there is shown a conduit 10 which receives a gaseous effluent from a chromatograph column (not shown) and which is to be discharged ultimately into the atmosphere by way of a larger bore tube 12. A solenoid operated two-way valve $V_1$ in line 10 carries the effluent either into a bypass tube 14 leading directly into large bore tube 12 or into a tube 16 which leads into a tube 18 depending on the position of valve $V_1$. Tube 18 leads into a bellows 22 and large bore tube 12 as is illustrated, and incorporates a solenoid operated on-off valve $V_2$ located between the inlet from tube 16 and the discharge into tube 12.

A tap 24 from tube 16 leads into a pressure increment detector 26 which is a highly sensitive device for measuring changes in pressure. A suitable and well known device is a capacitance type of pressure sensor which incorporates a diaphragm exposed on one side to the pressure to be measured and to the atmosphere on the other side. The diaphragm is one plate of a capacitor while another plate is inflexible. Lead 28 connects detector 26 to a capacity bridge 32 where the capacity of detector 26 is measured. The output of bridge 32 is amplified in servo amplifier $A_1$ and the resultant signal passes through gate $G_1$ to energize servo motor $M_1$. A timer and reset mechanism $T_1$ opens and closes gate $G_1$ in a manner to be described further below and may additionally be designed to actuate valves $V_1$ and $V_2$ to function as described below as indicated in phantom. Bridge 32, amplifier $A_1$ and servo motor $M_1$ makes up a servo system operating on an error signal as is well understood in the art.

The output shaft 34 of servo motor $M_1$ drives a gear 36 which simultaneously rotates drive nut 38 and a gear 42 which is connected to a suitable counter 44 for the purpose of counting rotations. Drive nut 38 which is threaded on its outer circumference so as to be driven by gear 36 has internal threads for engaging the threaded portion of rod 46. When nut 38 is driven, rod 46 will be moved along its axis as shown by double arrow X. Nut 38 is supported against axial movement by a bearing 47.

Rod 46 is connected rigidly against rotation at one end to the movable wall 48 of bellows 22 as illustrated. The opposite wall 52 of bellows 22 is fixed to tube 18 which is open to the interior of bellows 22.

In the operation of the apparatus just described, valve $V_1$ is in position for flow to pass from tube 10 to tube 16 while valve $V_2$ is open and bellows 22 is collapsed. Gate $G_1$ is closed so that no signal passes from servo amplifier $A_1$ to servo motor $M_1$. Hence, the effluent is flowing through tubes 10, 16 and 18 into large bore tube 12.

In order to set in motion the apparatus just described to measure the volumetric flow rate of the effluent, timer $T_1$ closes valve $V_2$ and opens gate $G_1$. Pressure in tube 16 begins to build up. At the first incremental increase in pressure sensed by detector 26, a servo signal is transmitted by way of bridge 32 and amplifier $A_1$ to motor $M_1$ which, through the gearing arrangement already described, begins to expand bellows 22 by the action of nut 38 and rod 46 on movable wall 48. By the operation of the servo system just described, bellows 22 acts as a receptacle for the flowing gas and expands at a rate to maintain pressure within tube 16 at its initial steady state value.

The rate at which bellows 22 expands to maintain the initial pressure in tube 16 is indicated by pulse readout device 44 which obtains its information directly from gears 42 and 36. Device 44 may be any suitable pulse readout device or counter to provide information on the expansion rate of bellows 22, as understood in the art, indicating the volumetric flow rate of the effluent.

After a given period of time, before bellows 22 is fully expanded, timer $T_1$ will close gate $G_1$ to block the signal from amplifier $A_1$ and simultaneously open valve $V_2$, and rotate valve $V_1$ to close the entrance to tube 16 and open the entrance to tube 14. Also, timer $T_1$ will pass a reset signal to reverse servo motor $M_1$ and so collapse bellows 22. After another given period of time, a new cycle is initiated by timer $T_1$. In the arrangement just described, the various valves can be actuated manually, if desired, or the system can be made to operate by limit switches engaged with movable wall 48 of bellows 22.

A system of the type illustrated in the figure was constructed and operated successfully with great accuracy. In that system, tubes 10, 14 and 16 had a bore of $\frac{1}{8}''$ while tubes 12 and 18 had a bore of $\frac{1}{2}''$. Bellows 22 was constructed of stainless steel and had a capacity of 25 ml. compressed and 50 ml. expanded. Rod 46 had an axial range of movement of one inch maximum and a turning rate of 40 turns per inch. Pulse readout 44 produced one pulse per revolution of gear 42.

It is thus seen that there has been provided a unique arrangement for the measurement of the volumetric flow of a gaseous fluid independent of density and viscosity. In the preferred embodiment described, the measurements are intermittent and are usually satisfactory. However, if it is desired to provide a continuous measurement of fluid flow, the system in effect may be duplicated so that a pair of bellows 22 may be utilized. In such an arrangement, one bellows would be expanding while the other is collapsing so that the measurements produced are not interrupted.

Other variations of the described embodiment are of course possible without departing from the principles of this invention. Thus, the invention is not to be limited to the described embodiment but only by the scope of the appended claims.

I claim:
1. Apparatus for measuring volumetric gas flow comprising:
   (a) main tube means for carrying all of said gas flow;
   (b) means for measuring the pressure of said gas at a preselected location in said main tube means;
   (c) first valve means downstream of said location for selectively blocking gas flow through, said first valve means being initially open to gas flow;
   (d) a variable volume receptacle;
   (e) means communicating said receptacle with said gas at a point between said location and said first valve means;
   (f) bypass tube means extending from said main tube means upstream of said location for bypassing said location, said communicating means and said first valve means;
   (g) second valve means in said main tube means upstream of said location having a first initial position blocking said bypass tube means and a second position blocking said main tube means;
   (h) means, upon blocking of flow by said first valve means, responsive to pressure increase detected by said pressure measuring means for expanding said receptacle to receive said gas at a rate sufficient to maintain the initial pressure;
   (i) means for measuring the expansion rate of said receptacle to indicate the volumetric flow rate of said gas; and
   (j) control means, upon full expansion of said receptacle, to unblock said first valve means, move said second valve means into its second position, and collapsing said receptacle so that gas stored therein will pass downstream through said first valve means, the gas flow through said apparatus continuing to flow normally.

2. The apparatus of claim 1 in which said receptacle is a bellows having a movable expansion wall, said expanding means comprising a servo system having a motor means to move said expansion wall and a servo signal means to produce the error signals to energize said motor means.

3. The apparatus of claim 2 in which said control means includes gate means, and timing and reset means for opening said gate means for a predetermined time to initiate the measuring cycle and to close said gate means and reset said bellows for the next measuring cycle.

References Cited
UNITED STATES PATENTS

| | | | |
|---|---|---|---|
| 2,892,346 | 6/1959 | Sargent | 73—194 |
| 3,234,785 | 2/1966 | Rimsha | 73—149 X |
| 3,245,256 | 4/1966 | Hayward | 73—194 |
| 3,241,361 | 3/1966 | Broughton | 73—149 |

RICHARD C. QUEISSER, Primary Examiner

J. K. LUNSFORD, Assistant Examiner

U.S. Cl. X.R.

73—194